(12) United States Patent
Karaoguz et al.

(10) Patent No.: US 8,126,434 B2
(45) Date of Patent: *Feb. 28, 2012

(54) SECURE USER INTERFACE IN A SHARED RESOURCE ENVIRONMENT

(75) Inventors: Jeyhan Karaoguz, Irvine, CA (US); James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/029,941

(22) Filed: Feb. 17, 2011

(65) Prior Publication Data

US 2011/0143717 A1    Jun. 16, 2011

Related U.S. Application Data

(63) Continuation of application No. 12/724,236, filed on Mar. 15, 2010, now Pat. No. 7,894,796, which is a continuation of application No. 10/875,883, filed on Jun. 24, 2004, now Pat. No. 7,706,777.

(60) Provisional application No. 60/505,277, filed on Sep. 23, 2003.

(51) Int. Cl.
  *H04M 1/66*   (2006.01)
  *H04W 4/00*   (2009.01)
(52) U.S. Cl. ............... 455/411; 455/435.1; 455/566; 455/557
(58) Field of Classification Search ........... 455/411, 455/435.1, 566, 557
See application file for complete search history.

(56) References Cited

U.S. PATENT DOCUMENTS

| | | | |
|---|---|---|---|
| 4,855,713 A | 8/1989 | Brunius | |
| 4,855,813 A | 8/1989 | Russell et al. | |
| 5,287,188 A | 2/1994 | Saeger et al. | |
| 5,502,493 A | 3/1996 | Meyer | |
| 5,532,714 A | 7/1996 | Knapp et al. | |
| 5,649,052 A | 7/1997 | Kim | |
| 5,686,916 A | 11/1997 | Bakhmutsky | |
| 5,794,116 A | 8/1998 | Matsuda et al. | |
| 5,796,396 A | 8/1998 | Rich | |
| 5,801,785 A | 9/1998 | Crump et al. | |
| 5,805,220 A | 9/1998 | Keesman et al. | |
| 5,872,784 A | 2/1999 | Rostoker et al. | |
| 5,933,192 A | 8/1999 | Crosby et al. | |
| 6,141,003 A | 10/2000 | Chor et al. | |
| 6,199,101 B1 | 3/2001 | Pfaff | |
| 6,222,926 B1 | 4/2001 | Cavallerano et al. | |
| 6,389,487 B1 | 5/2002 | Grooters | |
| 6,462,776 B2 | 10/2002 | Hudson | |
| 6,512,794 B1 | 1/2003 | Fujiwara et al. | |
| 6,631,163 B1 | 10/2003 | Peng | |

(Continued)

*Primary Examiner* — Barry W Taylor
(74) *Attorney, Agent, or Firm* — Brinks Hofer Gilson & Lione

(57) ABSTRACT

A system and method for providing a secure user interface in a shared resource environment. Various aspects of the present invention may comprise establishing a first wireless communication link between a first system and a user interface system. A first wireless communication port may, for example, establish such a wireless communication link. A first secure communication pathway may be established between the first system and the user interface system. A first secure communication module may, for example, establish such a secure communication pathway. A second wireless communication link may be established between a second system and the user interface system. A second wireless communication port may, for example, establish such a wireless communication link. A second communication pathway between the second system and the user interface system may be established. A second communication module may, for example, establish such a communication pathway.

24 Claims, 4 Drawing Sheets

U.S. PATENT DOCUMENTS

| | | |
|---|---|---|
| 6,836,787 B1 | 12/2004 | Kasai et al. |
| 6,842,777 B1 | 1/2005 | Tuli |
| 6,918,118 B2 | 7/2005 | Standridge et al. |
| 6,930,673 B2 | 8/2005 | Kaye et al. |
| 6,977,877 B2 | 12/2005 | Mori |
| 7,020,456 B2 | 3/2006 | Smeets et al. |
| 7,039,116 B1 | 5/2006 | Zhang et al. |
| 7,046,134 B2 | 5/2006 | Hansen |
| 7,180,901 B2 | 2/2007 | Chang et al. |
| 7,245,665 B2 | 7/2007 | Ueda et al. |
| 7,480,864 B2 | 1/2009 | Brook et al. |
| 7,706,777 B2 * | 4/2010 | Karaoguz et al. ............ 455/411 |
| 7,724,279 B2 | 5/2010 | Karaoguz et al. |
| 7,894,796 B2 * | 2/2011 | Karaoguz et al. ............ 455/411 |
| 2002/0005900 A1 | 1/2002 | Hudson |
| 2003/0026222 A1 | 2/2003 | Kotzin |
| 2003/0092437 A1 | 5/2003 | Nowlin et al. |
| 2003/0236890 A1 | 12/2003 | Hurwitz et al. |
| 2004/0014526 A1 | 1/2004 | Kulas |
| 2004/0061706 A1 | 4/2004 | Cronin et al. |
| 2004/0255136 A1 | 12/2004 | Fadyushin |
| 2005/0036509 A1 | 2/2005 | Acharya et al. |
| 2005/0063459 A1 | 3/2005 | Karaoguz et al. |
| 2005/0064846 A1 | 3/2005 | Karaoguz et al. |
| 2005/0066066 A1 | 3/2005 | Karaoguz et al. |
| 2005/0066068 A1 | 3/2005 | Karaoguz et al. |
| 2005/0154903 A1 | 7/2005 | Evans |
| 2010/0173580 A1 | 7/2010 | Karaoguz et al. |
| 2010/0214481 A1 | 8/2010 | Karaoguz et al. |

* cited by examiner

SECURE USER INTERFACE IN A SHARED RESOURCE ENVIRONMENT

CROSS-REFERENCE TO RELATED APPLICATIONS/INCORPORATION BY REFERENCE

This patent application is a continuation of U.S. patent application Ser. No. 12/724,236, filed Mar. 15, 2010, issuing Feb. 22, 2011 as U.S. Pat. No. 7,894,796; which is a continuation of U.S. patent application Ser. No. 10/875,883, filed Jun. 24, 2004, now U.S. Pat. No. 7,706,777; which makes reference to, claims priority to and claims benefit from U.S. provisional patent application Ser. No. 60/505,277, filed Sep. 23, 2003, and titled "SECURE USER INTERFACE IN A SHARED RESOURCE ENVIRONMENT." The contents of each of the above-mentioned applications are hereby incorporated herein by reference in their entirety. This patent application is related to U.S. patent application Ser. No. 10/885,404, titled "MULTIPLE DEVICE ACCESS WINDOWING DISPLAY", filed Jul. 6, 2004; U.S. patent application Ser. No. 10/874,680, now U.S. Pat. No. 7,724,279; U.S. patent application Ser. No. 12/774,482, titled "OS/APPLICATION BASED MULTIPLE DEVICE ACCESS WINDOWING DISPLAY", filed May 5, 2010; and U.S. patent application Ser. No. 10/874,636, titled "MULTIPLE DECODE USER INTERFACE", filed Jun. 23, 2004.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

A dynamic communication network may include a variety of systems and devices that may freely enter and leave the network. For example, a first device may move within range of a wireless communication network and become part of the communication network. A second device may, for example, move out of range of the wireless communication network and exit the communication network. A third device may, for example, exit from a sleep state and resume operation within the communication network.

Various devices in a dynamic communication network may, for example, communicate with a plurality of other systems or devices in the network. Such communication may, for example, occur sequentially or concurrently. For example, a wireless keyboard resource may enter a wireless communication network and communicate with a desktop computing system. A mouse keyboard resource may, for example, also enter the wireless communication network and also communicate with the desktop computing system. A laptop computing system may, for example, enter a wireless communication network and communicate with a video display resource.

Various systems and/or devices may communicate sensitive information with other devices in a dynamic communication network. For example, a user of a first system may utilize various system resources to process or present sensitive information (e.g., company proprietary or confidential information).

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method for providing a secure user interface in a shared resource environment. Various aspects of the present invention may comprise establishing a first wireless communication link between a first system and a shared system resource (e.g., a user interface system). A first wireless communication port may, for example, establish such a wireless communication link.

A first secure communication pathway may be established between the first system and the user interface system. A first secure communication module may, for example, establish such a secure communication pathway. The first secure communication pathway may, for example, extend between the first system and a user interface device (e.g., a video display device or window thereof) of the user interface system.

The first secure communication pathway may, for example, comprise decrypting encrypted information immediately prior to the use of such information. Such decrypted information may, for example, be stored in a secure memory module or may not be stored in a memory module at all. For example, in a video display scenario, encrypted video information may be decrypted immediately prior to utilizing such information to drive a video display, or decrypted video information may be stored in a secure memory module that may only be accessed by video display driving circuitry. Aspects of the first secure communication pathway may, for example, comprise controlling data echoing functionality along the first secure communication pathway.

A second wireless communication link may be established between a second system and the user interface system. A second wireless communication port may, for example, establish such a wireless communication link.

A second communication pathway may be established between the second system and the user interface system. A second communication module may, for example, establish such a communication pathway. The second communication pathway may, for example, extend between the second system and the user interface system. The second communication pathway may, for example, extend between the second system and a user interface device (e.g., a video display device or a window thereof) of the user interface system.

The second communication pathway may, for example, comprise a second secure communication pathway, which may be established by a second secure communication module. The second secure communication pathway may, for example, be securely isolated from the first secure communication pathway. Alternatively, for example, the second secure communication pathway may be communicatively coupled to the first secure communication pathway. Such communicative coupling may, for example, be implemented by sharing encryption key information between the first secure communication pathway and the second secure communication pathway. Such communicative coupling may, for example, be implemented by transcribing (e.g., using a transcription module) between information encoded with a first encryption key and information encoded with a second encryption key.

Various aspects of the present invention may comprise performing various authorization and authentication activities to determine whether the first and/or second systems may access the user interface system, and whether the first and second secure communication pathways may be communicatively coupled. The user interface system may, for example, comprise a secure access module to perform such authorization and authentication activities.

These and other advantages, aspects and novel features of the present invention, as well as details of illustrative aspects thereof, will be more fully understood from the following description and drawings.

DETAILED DESCRIPTION OF THE INVENTION

Figure 1:
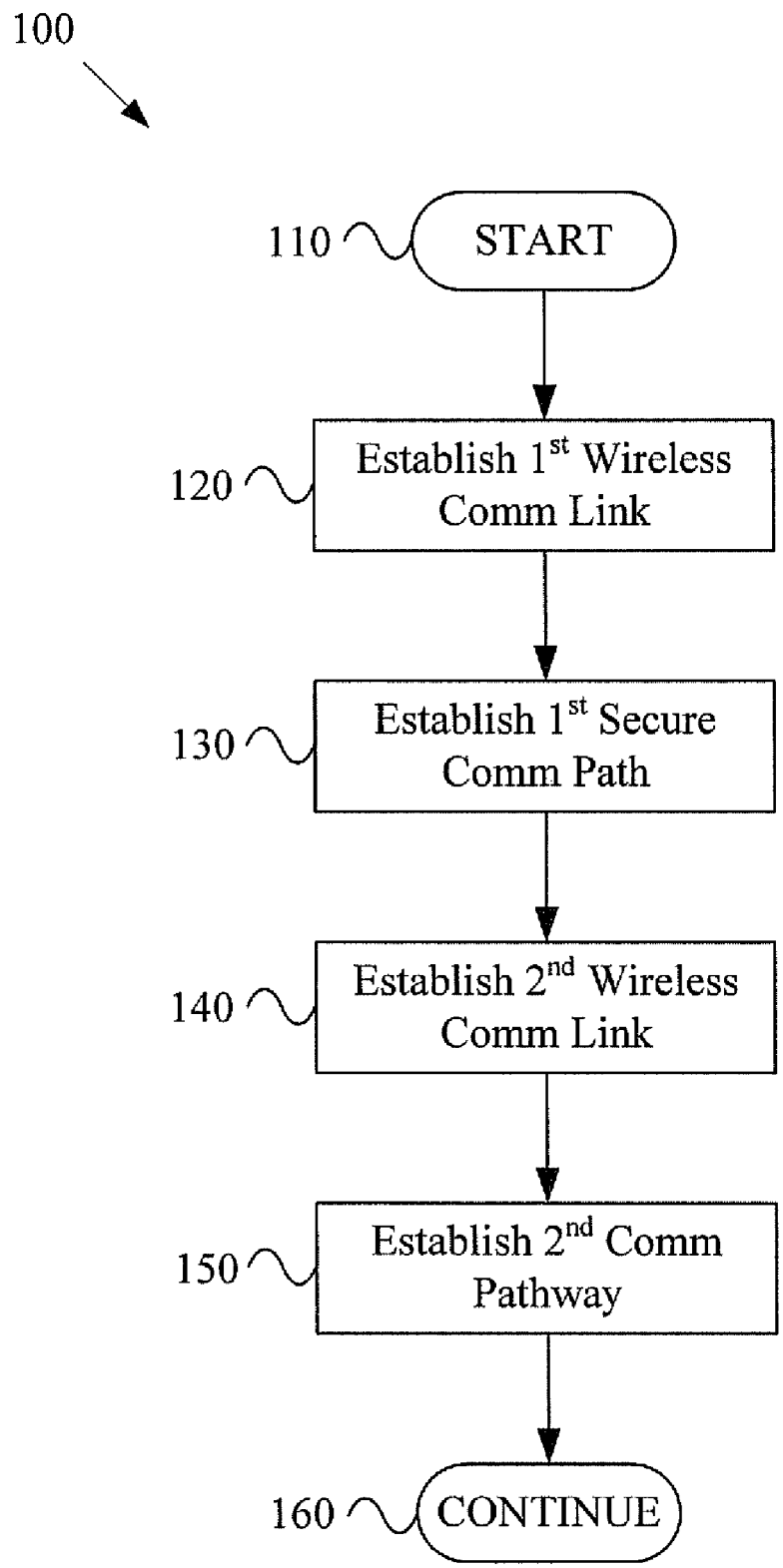
FIG. 1 is a flow diagram illustrating an exemplary method for providing a secure user interface in a shared resource environment, in accordance with various aspects of the present invention.

FIG. 1 is a flow diagram illustrating a method 100 for providing a secure user interface in a shared resource environment, in accordance with various aspects of the present invention. The method 100 begins at step 110. Various events and conditions may cause the method 100 to begin. For example, a user may request that a first system utilize a shared resource in a dynamic communication network. Alternatively, for example, the first system may automatically perform such utilization. In an exemplary scenario, a user may carry a first system in range of a shared resource in a dynamic wireless communication network, and the first system may automatically initiate communications with the shared resource. Generally, the method 100 may be initiated for a variety of reasons. Accordingly, the scope of various aspects of the present invention should not be limited by characteristics of particular initiating events or conditions.

The following discussion will focus on an exemplary scenario wherein the shared system resource is a user interface system (e.g., a video display system). However, the scope of various aspects of the present invention should not be limited by characteristics of a user interface system.

The method 100, at step 120, may comprise the user interface system (e.g., a video display system) establishing a first wireless communication link with a first system. The first wireless communication link may, for example, utilize any of a variety of standard and proprietary wireless communication protocols and techniques. For example, the first wireless communication link may utilize wireless RF or optical communication media. For example and without limitation, such a wireless communication link may be based on IEEE 802.11, 802.15, Bluetooth, Ultra Wideband (UWB), etc. Accordingly, the scope of various aspects of the present invention should not be limited by characteristics of a particular communication medium, technique or protocol.

The first system may comprise any of a large variety of systems and devices. For example and without limitation, the first system may comprise a video device, audio device, data device, user input device, user output device, etc. Accordingly, the scope of various aspects of the present invention should not be limited by characteristics of a particular type of first system.

The method 100, at step 130 may, for example, comprise the user interface system establishing a first secure communication pathway between the first system and a user interface device of the user interface system. A user interface device may, for example, comprise a video display device, sound generating device, or any of a variety of devices with which a user and system may communicate information. In an exemplary scenario comprising a video display device, the first secure communication pathway may extend between the first system and an output screen of the video display device. Also for example, the first secure communication pathway may extend between the first system and one or more windows output on the output screen of the video display device.

The first secure communication pathway may generally comprise an information path from a source device to a destination device through which information may flow securely (e.g., the information may flow without being accessed by an unauthorized user or system). Such a secure communication pathway may comprise a variety of characteristics, examples of which are discussed below.

For example and without limitation, a secure communication pathway may utilize encryption to protect information from being accessed by unauthorized systems. Also, for example, a secure communication pathway may decrypt encrypted information immediately prior to using the information. Such just-in-time decryption reduces exposure of non-encrypted information. For example, in a user interface system, user interface information may be decrypted immediately prior to utilizing the decrypted user interface information with a user interface device. Such decrypted information may then be erased immediately after use. In an exemplary scenario involving a video display system, encrypted video information may be decrypted immediately prior to using the decrypted video information to drive an output display device.

Additionally, for example, in a scenario where decrypted information must be stored in memory, the secure communication pathway may utilize secure memory. Such secure memory may, for example, not be accessible by devices that are not a part of the secure communication pathway. For example, in a user interface system, decrypted user interface information may be stored in a secure memory that is not accessible by devices outside of the user interface system. Also for example, in an exemplary video display system, decrypted video information may be stored in a secure display buffer that is only readable by display driving circuitry of the video display system.

The secure communication pathway may, for example, include controlling the security of one-way or two-way communications. For example, various system components may utilize data echoing techniques to ensure reliable communications. Various components of a secure communication pathway may eliminate or manage such data echoing activities so that non-encrypted information is not exposed to entities outside of the secure communication path.

Additionally, for example, step 130 may comprise utilizing various protocols to determine whether to form the first secure communication pathway between the first system and the user interface device. For example, step 130 may comprise the user interface system and the first system communicating to determine whether one or both of the systems have a particular level of secure communication capability. For example, the user interface system may determine that the first system is not capable of maintaining a particular level of security. In such an exemplary scenario, the user interface system may terminate execution of the method 100.

Additionally, for example, step 130 may comprise performing various authorization and authentication activities to determine whether the user interface system and/or the first system (or user thereof) are authorized to establish the first secure communication pathway. Such an authorization determination may also, for example, include determining whether the first system desires read access and/or write access to the user interface system. For example, a first system that is only interested in transmitting information to an output device may be subject to less authorization and/or authentication scrutiny than a first system that is interested in acquiring information from the user interface system. In an exemplary scenario involving a video display system, step 130 may allow any first system to communicate secure video information to the video display system, but only allow a select set of first systems to retrieve information from the video display system.

In general, step 130 may, for example, comprise establishing a first secure communication pathway between the first system and a shared resource (e.g., a user interface device of a user interface system). Accordingly, the scope of various aspects of the present invention should not be limited by characteristics of particular secure communication pathway architectures, methods or traits.

The method 100, at step 140, may comprise the user interface system (e.g., a video display system) establishing a second wireless communication link with a second system. Such a wireless communication link may, for example, be similar to the wireless communication link established between the user interface system and the first system at step 120. The second wireless communication link may, for example, utilize any of a variety of standard and proprietary wireless communication protocols and techniques. For example, the first wireless communication link may utilize wireless RF or optical communication media. For example and without limitation, such a wireless communication link may be based on IEEE 802.11, 802.15, Bluetooth, Ultra Wideband (UWB), etc. Accordingly, the scope of various aspects of the present invention should not be limited by characteristics of a particular communication medium, technique or protocol.

The second system may comprise any of a large variety of systems and devices. For example and without limitation, the first system may comprise a video device, audio device, data device, user input device, user output device, etc. Accordingly, the scope of various aspects of the present invention should not be limited by characteristics of a particular type of second system.

The method 100, at step 150, may comprise establishing a second communication pathway between the second system and the user interface system. The second communication pathway may, for example, comprise a non-secure and/or secure communication pathway. The second communication pathway may, for example, share various characteristics with the first secure communication pathway discussed previously with regard to step 130. The following discussion regarding the method 200 illustrated in FIG. 2 will illustrate various aspects of a second communication pathway and the establishment thereof. However the scope of various aspects of the present invention should not be limited by the following exemplary aspects.

Figure 2:
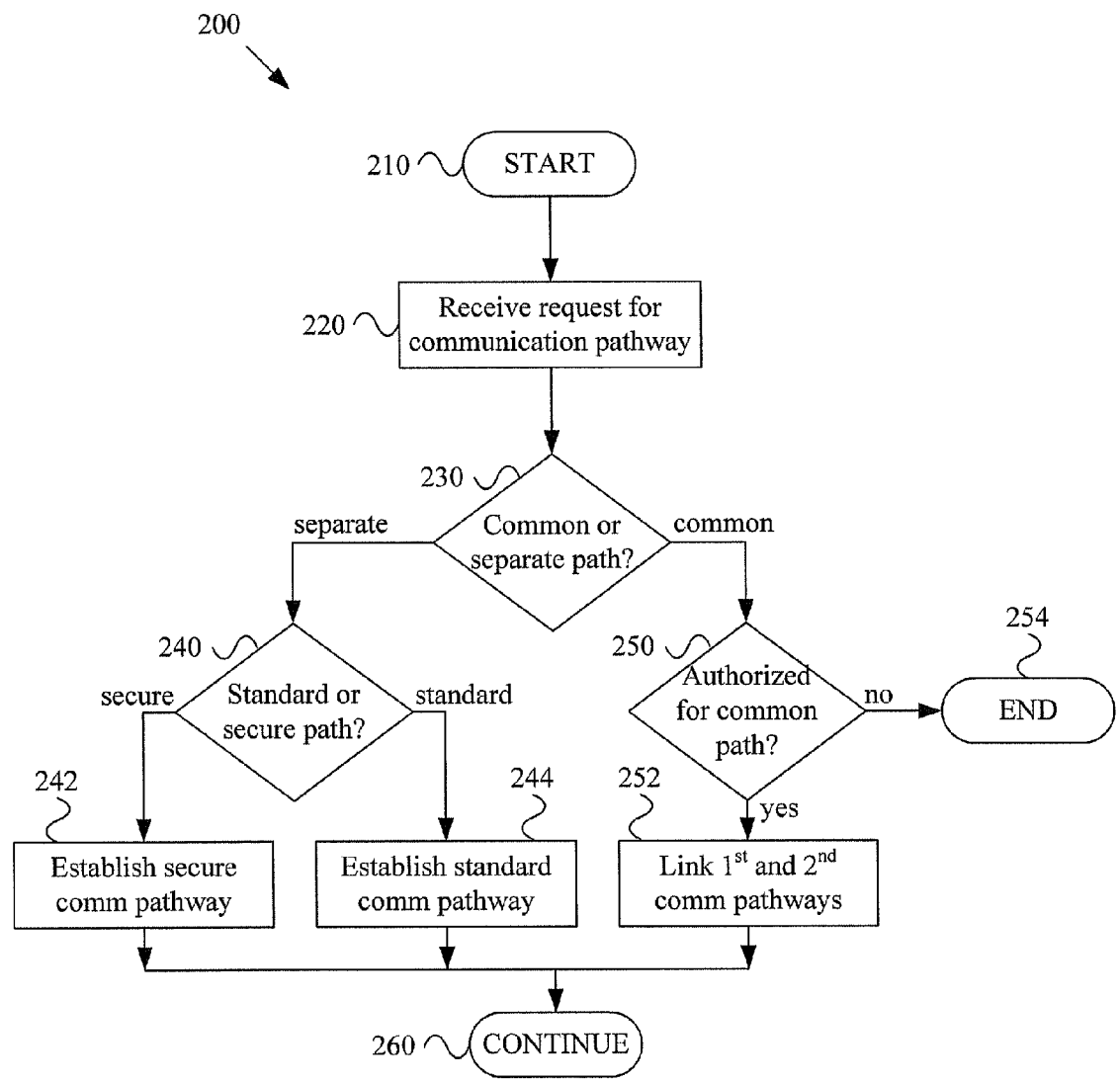
FIG. 2 is a flow diagram illustrating an exemplary method for establishing a second communication pathway, in accordance with various aspects of the present invention.

FIG. 2 is a flow diagram illustrating an exemplary method 200 for establishing a second communication pathway between a shared resource (e.g., a user interface system and/or video display system) and a second system, in accordance with various aspects of the present invention. The method 200 may, for example, share various aspects with step 150 of the method 100 illustrated in FIG. 1 and discussed previously. As mentioned previously, the method 200 is exemplary. Accordingly, characteristics of the exemplary method 200 should not limit the scope of various aspects of the present invention.

The method 200 begins at step 210. The method 200 may be initiated by a variety of conditions and circumstances. For example, the method 200 may be initiated by the establishment of a wireless communication link between a user interface system and a second system (e.g., as discussed previously with regard to step 140 of the method 100 illustrated in FIG. 1). The method 200 may, for example, be initiated manually or automatically. For example, a shared resource and/or a second system may be pre-programmed to automatically initiate the method 200 upon establishing a wireless communication link. Accordingly, the scope of various aspects of the present invention should not be limited by characteristics of particular initiating events or conditions.

The following discussion will focus on an exemplary scenario wherein the shared system resource is a user interface system (e.g., a video display system). However, the scope of various aspects of the present invention should not be limited by characteristics of a particular shared resource (e.g., a user interface system or a particular example thereof).

The method 200, at step 220, may, for example, comprise the user interface system receiving a request from a second system for a communication pathway between the user interface system, or component thereof, and the second system. Such a request may, for example, comprise a request for an independent non-secure communication pathway, a request for an independent secure communication pathway, or a request for a secure communication pathway linked to a pre-existing secure communication pathway (also referred to herein as a "common communication pathway"). An example of such a pre-existing secure communication pathway may comprise the first secure communication pathway formed in step 130 of the method 100 illustrated in FIG. 1 and discussed previously.

The method 200, at step 230, may comprise determining whether the second communication pathway is to comprise an independent (or separate) communication pathway or a linked (or common) communication pathway. Step 230 may, for example, make such a determination based on the request received at step 220. Alternatively, for example, step 230 may make such a determination based on operating conditions or predefined behavior. Accordingly, the scope of various aspects of the present invention should not be limited by a particular method or mechanism by which step 230 makes the determination.

If step 230 determines that the second communication pathway is to comprise an independent (or separate) communication pathway between the second system and the user interface system (or component thereof), then method 200 execution flows to step 240. If step 230 determines that the second communication pathway is to comprise a common communication pathway between the second system and a pre-existing communication pathway of the user interface system, then method 200 execution flows to step 250.

The method, at step 240, determines whether the second separate communication pathway is to comprise a secure communication pathway or non-secure communication pathway. Step 240 may, for example, make such a determination based on the request received at step 220. Alternatively, for example, step 240 may make such a determination based on operating conditions or predefined behavior. Accordingly, the scope of various aspects of the present invention should not be limited by a particular method or mechanism by which step 240 makes the determination.

If step 240 determines that the second separate communication pathway is to comprise a secure communication pathway, then the method 200 execution flows to step 242. If step 240 determines that the second separate communication pathway is to comprise a non-secure communication pathway, then the method 200 execution flows to step 244.

The method 200, at step 242, may comprise establishing an independent secure communication pathway between the user interface system and the second system. That is, step 242 may establish a second secure communication link that is generally not communicatively coupled to a pre-existing first secure communication link.

Step 242 may, for example, comprise various general aspects of establishing a secure communication pathway. Exemplary illustrations of various aspects were provided previously with regard to the discussion of step 130 of the method 100 illustrated in FIG. 1. Step 242 may comprise none, a subset, all or a superset of the previously discussed secure communication pathway aspects.

For example, in an exemplary scenario where the user interface system comprises a video display system, step 220 may receive a request for an independent secure communication pathway between the second system and a display device of the video display system (e.g., to a dedicated window of the display device). In such a scenario, step 230 may determine that an independent communication pathway is to be established, and method 200 execution may flow to step 240. Step 240 then may determine that a secure communication pathway is to be established, and method 200 execution may flow to step 242. Step 242 may then establish an independent secure communication pathway between the display device (or a window thereof) and the second system.

For example and without limitation, in an exemplary scenario, a first system may be communicatively coupled to a first window of a display device with a first secure communication pathway, and a second system may be communicatively coupled to a second window of the display device with a second secure communication pathway, where the first and second secure communication pathways are securely isolated from each other.

The method 200, at step 244, may comprise establishing an independent non-secure (or standard) communication pathway between the user interface system and the second system. For example, in an exemplary scenario where the user interface system comprises a video display system, step 220 may receive a request for an independent non-secure communication pathway between the second system and a display device of the video display system (e.g., to a dedicated window of the display device). In such a scenario, step 230 may determine that an independent communication pathway is to be established, and method 200 execution may flow to step 240. Step 240 may then determine that a non-secure communication pathway is to be established, and method 200 execution may flow to step 244. Step 244 may then establish an independent non-secure communication pathway between the display device (or a window thereof) and the second system.

For example and without limitation, in an exemplary scenario, a first system may be communicatively coupled to a first window of a display device with a first secure communication pathway, and a second system may be communicatively coupled to a second window of the display device with a second non-secure communication pathway, where the first secure communication pathway is securely isolated from the second non-secure communication pathway.

The method 200, at step 250, determines whether the second system and/or user thereof is authorized to establish a secure communication pathway between the second system and the user interface system that is linked to (e.g., communicatively coupled with) a first secure communication pathway already existing in the user interface system. Step 250 may, for example, make such a determination based on the request received at step 220. Alternatively, for example, step 250 may make such a determination based on operating conditions or predefined behavior. Accordingly, the scope of various aspects of the present invention should not be limited by a particular method or mechanism by which step 250 makes the determination.

If step 250 determines that the second system and/or user thereof is not authorized to establish a communication pathway that is linked to a first secure communication pathway, then the method 200 execution flows to step 254, where execution of the method 200 may terminate. If step 250 determines that the second system and/or user thereof is authorized to establish a communication pathway that is linked to a first secure communication pathway, then the method 200 execution flows to step 252.

Step 250, in determining whether the second system and/or user thereof are authorized to establish the common secure communication pathway may comprise analyzing any of a large variety of secure access conditions. The following discussion will present a non-limiting set of exemplary analyses. Accordingly, the scope of various aspects of the present invention should not be limited by characteristics of any secure access conditions or the processing thereof.

Step 250 may, for example, comprise determining whether access by the second system and/or user thereof to the user interface system or a component thereof is authorized. For example, the user interface system may comprise a variety of secure access conditions that only allow particular systems or particular users to establish a communication pathway with the user interface system. For example and without limitation, step 250 may comprise performing user authentication utilizing any of a large variety of methods or mechanisms, such as, user ID and password protection, retinal scan identification, finger print identification, biorhythm identification, facial identification, voice identification, etc. Step 250 may, for example, compare the identity of the second system and/or user thereof to a list of authorized entities with which a communication pathway may be established.

Note that communication pathway authentication may be dependent on a particular component of the user interface system. For example, in an exemplary scenario involving a video display device, step 250 may determine that a particular second system is authorized for access to a display component of the user interface system but is not authorized for access to a memory device of the user interface system.

Step 250 may, for example, comprise determining whether access by the second system and/or user thereof to the first secure communication pathway is authorized. For example and without limitation, a first system, with which the first secure communication pathway is established, may communicate secure access information with the user interface system. For example, the first system may communicate a list of other systems and/or users that are authorized to establish a communication pathway that is communicatively coupled to the first secure communication pathway. Alternatively, for example, the first system may maintain a list of authorized systems and/or users, and the user interface system may forward an access request to the first system, which then provides an indication to the user interface system of whether the access request should be granted or denied.

Step 250 may, for example, comprise determining whether the second system has a particular secure communication capability. For example, for a second system to be provided with a second communication pathway that is communicatively coupled to a first secure communication pathway, the second system may be required to have a particular secure communication capability. For example, the second system may be required to implement a particular encryption/decryption method. Also for example, the second system may be required to manage data echoing in a particular manner. Additionally, for example, the second system may be required to only store information obtained from the first secure communication pathway in an encrypted format. Generally, step 250 may, for example, comprise determining whether the second system handles secure information and/or the communication of secure information in an appropriate manner.

In an exemplary scenario, a first system, with which the user interface system is communicating using a first secure communication pathway, may indicate to the user interface system the secure communication capability that a second system must have to be allowed to establish a communication pathway that is communicatively coupled to the first secure communication pathway. Alternatively, for example, the user interface system may communicate information of the second system's secure communication capability to the first system for the first system to analyze and indicate to the user interface system whether the second system is authorized to establish the communication pathway.

Step 250 may, for example, comprise determining whether the second system and/or user thereof desires the ability to obtain information from the user interface system and/or from the first secure communication pathway. For example and without limitation, step 250 may comprise determining whether the second system desires to obtain information from the user interface system. Obtaining information from the user interface system and/or the first secure communication pathway may require a relatively high level of authorization and security. Alternatively, for example, providing information to the user interface system and/or the first secure communication pathway may require a different level of authorization and security.

The previous discussion presented exemplary secure access analyses that step 250 may comprise. As mentioned previously, however, the scope of various aspects of the present invention should by no means be limited by characteristics of the exemplary secure access analyses discussed previously.

The method 200, at step 252, may comprise establishing a second secure communication pathway that is linked to (e.g., communicatively coupled with) a first secure communication pathway. Step 252 may, for example, comprise forming the second secure communication pathway. Step 252 may, for example, comprise various general aspects of establishing a secure communication pathway. Exemplary illustrations of such aspects were provided previously with regard to the discussion of step 130 of the method 100 illustrated in FIG. 1. Step 252 may comprise none, a subset, all or a superset of the previously discussed aspects.

Step 252 may comprise linking (e.g., communicatively coupling) the second secure communication pathway to a first secure communication pathway. Step 252 may, for example, communicatively couple the second secure communication pathway to the first secure communication pathway in any of a variety of ways. For example and without limitation, step 252 may comprise sharing encryption key information. For example, in a scenario where the first secure communication pathway utilizes a first encryption key, the first system or the user interface system may communicate information of the first encryption key to the second system.

Also for example, step 252 may comprise transcribing between information encrypted with a first encryption key and information encrypted with a second encryption key. For example, in a scenario where the first secure communication pathway comprises information encrypted with a first encryption key, and the second secure communication pathway comprises information encrypted with a second encryption key, step 252 may comprise transcribing between information encrypted with the first encryption key and information encrypted with the second key. In such an exemplary scenario, the first and second secure communication pathways may be communicatively coupled while being based on respective and different encryption keys.

In an exemplary scenario where the user interface system comprises a video display system, step 220 may receive a request for a shared secure communication pathway between a second system and a display device of the video display system (e.g., to a common window of the display device), where the shared secure communication pathway is to be communicatively coupled to a pre-existing first secure communication pathway that extends between the display device and a first system. In such an exemplary scenario, step 230 may determine that a common secure communication pathway is to be established, and method 200 execution may flow to step 250. Step 250 may then determine that the second system and/or user thereof is authorized to establish a second secure communication pathway that is communicatively coupled to the first secure communication pathway, and method 200 execution may flow to step 252. Step 252 may then establish a second secure communication pathway between the display device (or a window thereof) and the second system and communicatively couple the second secure communication pathway to the first secure communication pathway.

Figure 3:
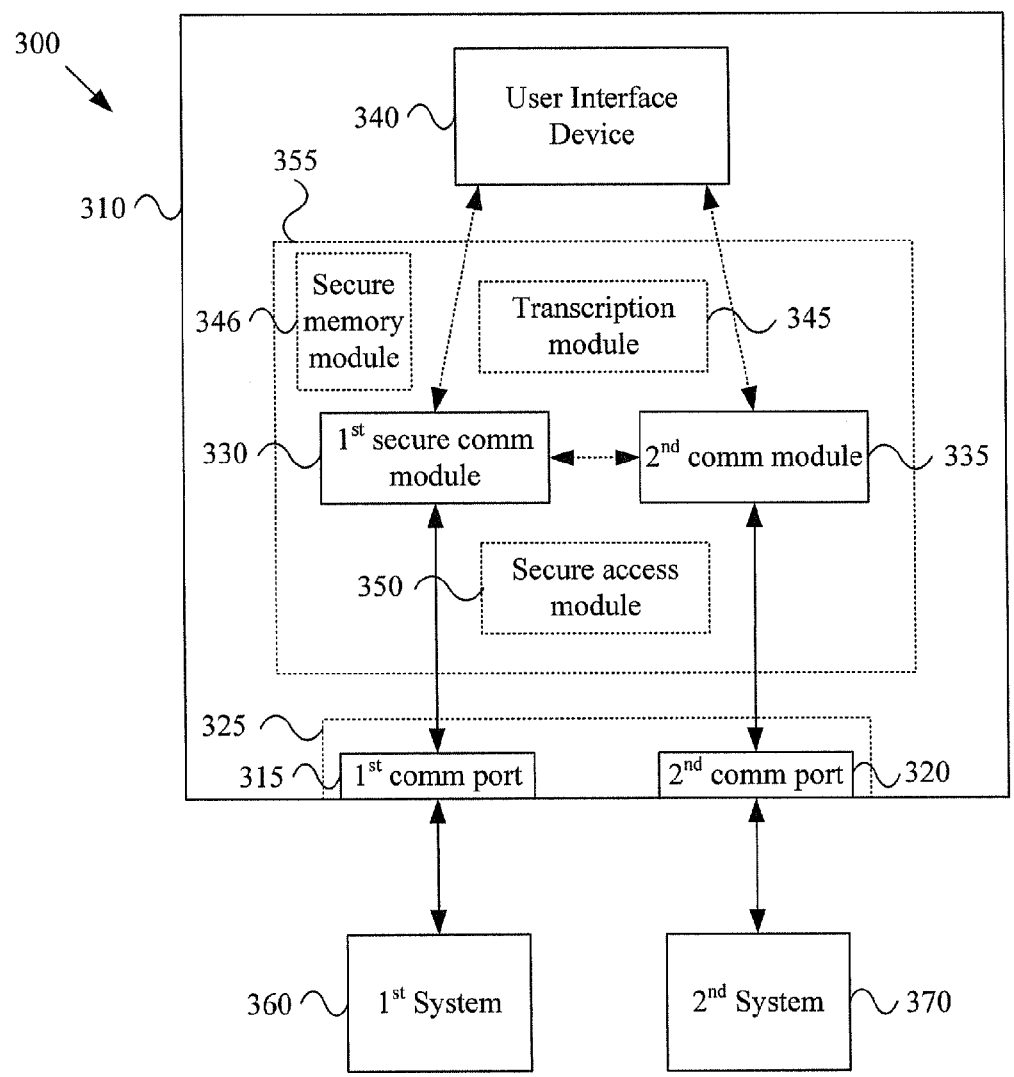
FIG. 3 is a diagram showing an exemplary system for providing a secure user interface in a shared resource environment, in accordance with various aspects of the present invention.

FIG. 3 is a diagram showing an exemplary system 300 providing a secure user interface in a shared resource environment, in accordance with various aspects of the present invention. The exemplary system 300 may comprise a user interface system 310 as an exemplary shared resource. However, the user interface system 310 example should by no means limit the scope of various aspects of the present invention to embodiments comprising a user interface system. The exemplary system 300 may also, for example, comprise a first system 360 and a second system 370.

Figure 4:
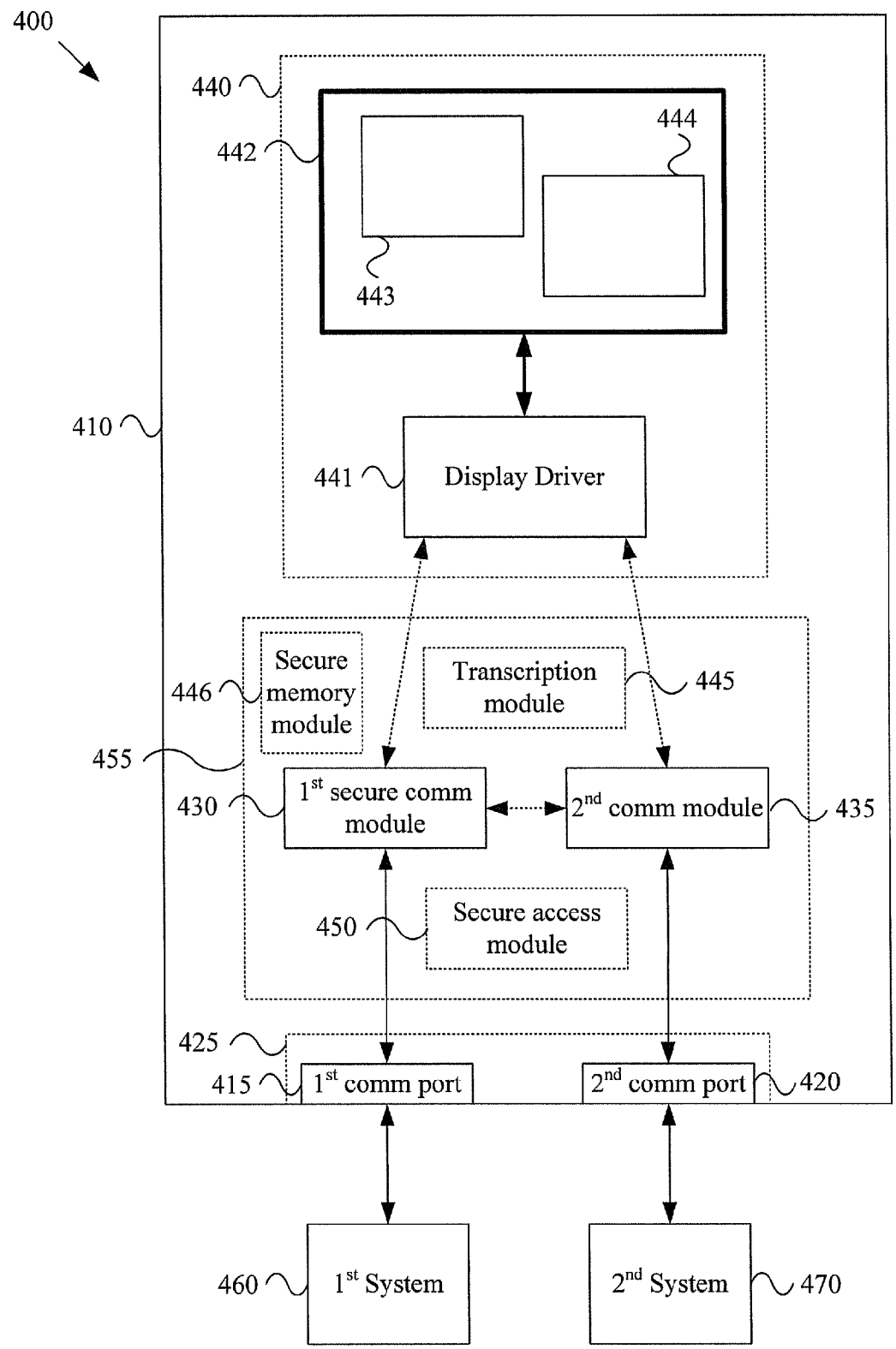
FIG. 4 is a diagram showing an exemplary system for providing a secure user interface in a shared display resource environment, in accordance with various aspects of the present invention.

FIG. 4 is a diagram showing an exemplary system 400 for providing a secure user interface in a shared video display resource environment, in accordance with various aspects of the present invention. The exemplary system 400 may, for example, share various aspects with the exemplary system 300 illustrated in FIG. 3, albeit in the context of a shared video display resource environment. The following discussion will generally focus on the exemplary system 300 shown in FIG. 3 and will occasionally refer to aspects of the exemplary system 400 shown in FIG. 4 to present contextualized examples.

The user interface system 310 may comprise a first communication port 315 and a second communication port 320. The user interface system 310 may comprise a first secure communication module 330 communicatively coupled to the first communication port 315, and a second communication module 335 communicatively coupled to the second communication port 320. The user interface system 310 may also, for example, comprise a secure access module 350, transcription module 345 and a secure memory module 346. The user interface system 310 may further comprise a user interface device 340.

Various components of the user interface system 310 may be grouped or combined in various physical components. For example and without limitation, the first communication port 315 and second communication port 320 may be combined in a single aggregate communication port 325. Also for example, the first secure communication module 330, second communication module 335, secure access module 350, transcription module 345 and secure memory module 346 may be combined in a single aggregate module 355. Such an aggregate communication port 325 and aggregate module 355 may, for example, be integrated on respective integrated circuits or on a single integrated circuit. Also, various aspects of the aforementioned modules and components may be implemented in hardware, software, and various combinations thereof. Accordingly, the scope of various aspects of the present invention should not be limited by boundaries between various modules or details of particular implementations.

The first communication port 315 may, for example, establish a first wireless communication link with the first system 360. The first communication port 315 may, for example, implement various aspects of step 120 of the method illustrated in FIG. 1 and discussed previously.

The first communication port 315 may establish a wireless communication link with the first system 360 utilizing any of a variety of standard and proprietary wireless communication protocols and techniques. For example, the wireless communication link may utilize wireless RF or optical communication media. Additionally, for example, the first communication port 315 may establish a wireless communication link based on various standard and proprietary communication protocols (e.g., IEEE 802.11, 802.15, Bluetooth and Ultra Wideband (UWB)). Accordingly, the scope of various aspects of the present invention should not be limited by characteristics of a particular communication medium, technique or protocol.

The first system 360 may comprise any of a large variety of systems and devices. For example and without limitation, the first system 360 may comprise a video device, audio device, data device, user input device, user output device, etc. Accordingly, the scope of various aspects of the present invention should not be limited by characteristics of a particular type of first system 360.

Referring to FIG. 4, the first communication port 415 may, for example, establish a first wireless communication link (e.g., a wireless video information link) with the first system 460. The first system 460 may, for example comprise any device that provides video information to be displayed. For example, and without limitation, the first system 460 may comprise a video camera, a laptop computer, a DVD player, a desktop computing system, a personal digital assistant, etc. The first system 460 may provide video information to the first communication port 415 over the first wireless communication link.

Referring back to FIG. 3, the first secure communication module 330 may, for example, establish a first secure communication pathway between the first system 360 and the user interface device 340. The user interface device 340 may, for example, comprise a video display device, sound generating device, or any of a variety of devices with which a user and system may communicate information.

Referring to FIG. 4, in an exemplary scenario where the user interface device 440 comprises a video display device 442, the first secure communication pathway may extend between the first system 460 and the output screen of the video display device 442. Also for example, the first secure communication pathway may extend between the first system 460 and a first window 443 (or plurality of windows) output on the screen of the video display device 442.

Referring back to FIG. 3, as mentioned previously, the first secure communication pathway may generally comprise an information path from a source device to a destination device through which information may flow securely (e.g., the information may flow without being accessed by an unauthorized user or system). Such a secure communication pathway may comprise a variety of characteristics, examples of which are discussed below. The examples discussed below may share various aspects with exemplary secure communication pathway characteristics discussed previously with regard to the method 100 illustrated in FIG. 1.

For example and without limitation, the first secure communication module 330 may utilize encryption and decryption to protect information from being accessed by an unauthorized system. For example, the first secure communication module 330 may decrypt encrypted information immediately prior to using the information. For example, in the exemplary user interface system 310, the first secure communication module 330 may decrypt user interface information in the first secure communication pathway immediately prior to utilizing the decrypted user interface information with the user interface device 340. The first secure communication module 330 may then, for example, purge the decrypted user interface information from the first secure communication module 330 and any other component of the user interface system 310.

In a scenario where decrypted information must be stored in memory, the first secure communication module 330 may utilize a secure memory module 346 to store the decrypted information. The secure memory module 346, for example, may not be accessible by devices that are not part of the first secure communication pathway. Also for example, the secure memory module 346 may not be accessible by devices that are not part of a particular portion of the first secure communication pathway (e.g., a portion of the first secure communication pathway communicationally downstream from the secure memory module 346).

Referring to FIG. 4, the first secure communication module 430 may, for example, decrypt video information received from the first system 460 immediately prior to providing the decrypted video information to the display driver 441. The display driver 441 may then utilize the decrypted video information to drive the display device 442. In a scenario where decrypted information must be stored in memory, the first secure communication module 460 may, for example, store decrypted video information in the secure memory module 446, which may subsequently be provided to the display driver 441.

Referring back to FIG. 3, the first secure communication module 330 may, for example, control the security of one-way or two-way communications. For example, various system components may utilize data echoing techniques to ensure reliable communications, thereby potentially creating two-way communication of sensitive information. Various components of a secure communication pathway, including the first secure communication module 330, may eliminate or manage such data echoing activities so that non-encrypted information is not exposed to entities outside of the secure communication pathway.

Additionally, for example, the first secure communication module 330 may utilize various protocols to determine whether to form the first secure communication pathway between the first system 360 and the user interface device 340. For example, the first secure communication module 330 may communicate with the first system 360 to determine whether one or both of the systems have a particular level of secure communication capability. For example, the first secure communication module 330 may determine that the first system 360 is not capable of maintaining a particular level of security. In such an exemplary scenario, the first secure communication module 330 may deny the first system 360 a secure communication pathway to the user interface system 310 or a component thereof.

Additionally, for example, the first secure communication module 330 may utilize the secure access module 350 to determine whether the user interface system 310 and/or the first system 360 (or user thereof) are authorized to establish the first secure communication pathway. The secure access module 350 may, for example, determine whether the first system 360 desires read access and/or write access to the user interface system 310. For example, the secure access module 350 may subject a first system 360 that is only interested in transmitting information to the user interface device 340 to less authorization and/or authentication scrutiny than a first system 360 that is interested in acquiring information from the user interface system 310.

In general, the first secure communication module 330 may establish a first secure communication pathway between the first system 360 and a shared resource (e.g., the user interface device 340 of the exemplary user interface system 310). Accordingly, the scope of various aspects of the present invention should not be limited by characteristics of particular secure communication pathway architectures, methods or traits.

The second communication port 320 may establish a second wireless communication link with the second system 370. The second communication port 320 may, for example, share various aspects with the first communication port 315. The second communication port 320 may establish the second wireless communication link with the second system 370 utilizing any of a variety of standard and proprietary wireless communication protocols, media and techniques. Accordingly, the scope of various aspects of the present invention should not be limited by characteristics of a particular communication medium, technique or protocol.

The second system 370, similar to the first system 360, may comprise any of a large variety of systems and devices. For example and without limitation, the second system may comprise a video device, audio device, data device, user input device, user output device, etc. Accordingly, the scope of various aspects of the present invention should not be limited by characteristics of a particular type of second system 370.

The second communication module 335 may establish a second communication pathway between the second system 370 and the user interface system 310. The second communication module 335 may, for example, implement various aspects of the method steps 150 and 210-260 discussed previously and illustrated in FIGS. 1-2. The second communication module 335 may, for example, share various aspects with the first communication module 330 discussed previously.

The second communication pathway may, for example, comprise a non-secure and/or secure communication pathway. The second communication pathway may, for example, share various characteristics with the first secure communication pathway discussed previously with regard to the method step 130 illustrated in FIG. 1.

The second communication module 335 may establish the second communication pathway in response to any of a variety of conditions or circumstances. For example, the second communication module 335 may establish the second communication pathway in response to a request from the second system 370 over the second wireless communication link. Also, for example, the second communication module 335 may establish the second communication pathway automatically and/or in response to a pre-programmed set of instructions. Accordingly, the scope of various aspects of the present invention should not be limited by characteristics of particular initiating events or conditions.

The second communication module 335 may, for example, receive a request from the second system 370 for a communication pathway between the user interface system 310, or a component thereof, and the second system 370. Such a request may, for example, comprise a request for an independent non-secure communication pathway, a request for an independent secure communication pathway, or a request for a secure communication pathway linked to a pre-existing secure communication pathway (also referred to herein as a "common communication pathway"). An example of such a pre-existing secure communication pathway may comprise the above-mentioned exemplary first secure communication pathway between the first system 360 and the user interface device 340 established by the first secure communication module 330.

The second communication module 335 may determine whether the second communication pathway is to comprise an independent (or separate) communication pathway or a linked (or common) communication pathway. The second communication module 335 may, for example, make such a determination based on a request received from the second system 370. Alternatively, for example, the second communication module 335 may make such a determination based on operating conditions or predefined behavior. Accordingly, the scope of various aspects of the present invention should not be limited by a particular method or mechanism by which the second communication module 335 makes the determination.

If the second communication module 335 determines that the second communication pathway is to comprise an independent secure communication pathway between the second system 370 and the user interface system 310 (or component thereof), then the second communication module 335 may establish such an independent secure communication pathway. For example and without limitation, the second communication module 335 may perform various aspects of steps 130, 150 and 242 of the methods 100 and 200 illustrated in FIGS. 1-2 and discussed previously.

Referring to FIG. 4, in an exemplary scenario, the second communication module 435 may receive a request for an independent secure communication pathway between the second system 470 and the display device 442 of the video display system 440 (e.g., to a dedicated second window 444 of the display device). In response to such a request, the second communication module 435 may, for example, utilize the secure access module 450 to determine whether the second system 470 and/or user thereof is authorized for such a communication pathway. If the second system 470 and/or user thereof is authorized, the second communication module 435 may establish the requested independent secure communication pathway between the second system 470 and the display device 442 (or a second window 444 thereof). In such an exemplary scenario, the first system 460 may be communicatively coupled to the first window 443 of the display device 442 with a first secure communication pathway, and the second system 470 may be communicatively coupled to the second window 444 of the display device 442 with a second secure communication pathway, where the first and second secure communication pathways are securely isolated from each other.

Referring back to FIG. 3, if the second communication module 335 determines that the second communication pathway is to comprise an independent non-secure communication pathway between the second system 370 and the user interface system 310 (or component thereof), then the second communication module 335 may establish such a communication pathway. For example and without limitation, the second communication module 335 may perform various aspects of steps 150 and 244 of the methods 100 and 200 illustrated in FIGS. 1-2 and discussed previously.

Referring to FIG. 4, in an exemplary scenario where the user interface system 410 comprises a video display system 440 having a display device 442, the second communication module 435 may receive a request for an independent non-secure communication pathway between the second system 470 and the display device 442 (e.g., to a dedicated window 444 of the display device 442). In response to such a request, the second communication module 435 may, for example, utilize the secure access module 450 to determine whether the second system 470 and/or user thereof is authorized for such a communication pathway. If the second system 470 is authorized, the second communication module 435 may establish the requested independent non-secure communication pathway between the second system 470 and the display device 442 (or second window 444 thereof).

For example and without limitation, in an exemplary scenario, the first system 460 may be communicatively coupled to a first window 443 of the display device 442 with a first secure communication pathway, and the second system 470 may be communicatively coupled to a second window 444 of the display device 442 with a second non-secure communication pathway, where the first secure communication pathway is securely isolated from the second non-secure communication pathway.

Referring back to FIG. 3, if the second communication module 335 determines that the second communication pathway is to comprise a shared (or common) secure communication pathway between the second system 370 and the user interface system 310 (or component thereof), then the second communication module 335 may establish such a communication pathway.

For example, the second communication module 335 may utilize the secure access module 350 to determine whether the second system 370 and/or user thereof is authorized to establish a secure communication pathway between the second system 370 and the user interface system 310 that is linked to (e.g., communicatively coupled with) a first secure communication pathway in the user interface system 310. The secure access module 350 may, for example, make such a determination based on a request received by the second communication module 335 from the second system 370. Alternatively, for example, the secure access module 350 may make such a determination based on operating conditions or predefined behavior. Accordingly, the scope of various aspects of the present invention should not be limited by a particular apparatus, method or mechanism by which the second communication module 335 and/or secure access module 350 makes the determination.

If the secure access module 350 determines that the second system 370 and/or user thereof is not authorized to establish a communication pathway that is linked to a first secure communication pathway, then the second communication module 335 may, for example, terminate communications with the second system 370 or may, for example, offer the second system 370 a different type of communication pathway. If the secure access module 350 determines that the second system 370 and/or user thereof is authorized to establish a communication pathway that is linked to a first secure communication pathway, then the second communication module 335 may establish such a communication pathway.

The secure access module 350, in determining whether the second system 370 and/or user thereof are authorized to establish the common secure communication pathway may analyze any of a large variety of secure access conditions. The following discussion will present a non-limiting set of exemplary secure access analyses. Accordingly, the scope of various aspects of the present invention should not be limited by characteristics of any secure access conditions or the processing thereof.

The secure access module 350 may, for example, determine whether access by the second system 370 and/or user thereof to the user interface system 310 and/or a component thereof is authorized. For example, the user interface system 310 may comprise a variety of secure access conditions that only allow particular systems or particular users to establish a communication pathway with the user interface system. For example and without limitation, the secure access module 350 may determine user authentication utilizing any of a large variety of methods or mechanisms, such as, user ID and password protection, retinal scan identification, finger print identification, biorhythm identification, facial identification, voice identification, etc. The secure access module 350 may, for example, compare the identity of the second system 370 and/or user thereof to a list of authorized entities with which a communication pathway may be established.

Note that communication pathway authentication may be dependent on a particular component of the user interface system 310. For example, in an exemplary scenario where the user interface device 340 comprises a video display device and a memory device, the secure access module 350 may determine that a particular second system 370 is authorized for access to the video display device but is not authorized for access to a memory device of the user interface device 340.

The secure access module 350 may, for example, determine whether access by the second system 370 and/or user thereof to the first secure communication pathway is authorized. For example and without limitation, a first system 360, with which the first secure communication pathway is established, may communicate secure access information with the secure access module 350. For example, the first system 360 may communicate a list of other systems and/or users that are authorized to establish a communication pathway that is communicatively coupled to the first secure communication pathway. Alternatively, for example, the first system 360 may maintain a list of authorized systems and/or users, and the secure access module 350 may forward an access request to the first system 360, which then provides an indication to the secure access module 350 of whether the access request should be granted or denied. The secure access module 350 may, for example, perform any of a variety of authorization and authentication activities, some of which were discussed previously.

The secure access module 350 may, for example, determine whether the second system 370 has a particular secure communication capability. For example, for the second system 370 to be provided with a second communication pathway that is communicatively coupled to a first secure communication pathway, the second system 370 may be required to have a particular secure communication capability. For example, the second system 370 may be required to implement a particular encryption/decryption method. Also for example, the second system 370 may be required to manage data echoing in a particular manner. Additionally, for example, the second system 370 may be required to only store information obtained from the first secure communication pathway in an encrypted format. Generally, the secure access module 350 may, for example, determine whether the second system 370 manages secure information and/or the communication of secure information in an appropriate manner.

In an exemplary scenario, a first system 360, with which the user interface system 310 is communicating using a first secure communication pathway, may indicate to the secure access module 350 the secure communication capability that the second system 370 must have to be allowed to establish a communication pathway that is communicatively coupled to the first secure communication pathway. Alternatively, for example, the secure access module 350 may communicate information of the second system's secure communication capability to the first system 360 for the first system 360 to analyze and indicate to the secure access module 350 whether the second system 370 is authorized to establish the communication pathway.

The secure access module 350 may, for example, determine whether the second system 370 and/or user thereof desires the ability to obtain information from the user interface system 310 and/or from the first secure communication pathway. For example and without limitation, the secure access module 350 may determine whether the second system 370 desires to obtain information from the user interface system 310. Obtaining information from the user interface system 310 and/or the first secure communication pathway may require a relatively high level of authorization and security. Alternatively, for example, providing information to the user interface system 310 and/or the first secure communication pathway may require a different level of authorization and security.

The previous discussion presented exemplary secure access analyses that the second communication module 335 and/or the secure access module 350 may perform. As mentioned previously, however, the scope of various aspects of the present invention should by no means be limited by characteristics of the exemplary secure access analyses discussed previously.

If the second communication module 335 determines (e.g., by utilizing the secure access module 350) that the second system 370 is authorized to have a second secure communication pathway that is communicatively coupled to the first secure communication pathway, then the second communication module 335 may link the first and second secure communication pathways. For example, the second communication module 335 may communicatively couple the second secure communication pathway (e.g., between the user interface system 310 or component thereof and the second system 370) and the first secure communication pathway (e.g., between the user interface system 310 or component thereof and the first system 360).

Referring to FIG. 4, in an exemplary scenario where the user interface system 410 comprises a video display system 440 having a display device 442, the second communication module 435 may receive a request for a secure communication pathway between the second system 470 and the display device 442 that is linked to a pre-existing secure communication pathway (e.g., a first secure communication pathway between the first system 460 and the first window 443 of the display device 442). In such a scenario, the second communication module 435 may respond to such a request by utilizing the secure access module 450 to perform a secure access check to determine whether the second system 470 and/or user thereof is authorized for establishing such a common communication pathway. If the second system 470 is authorized, then the second communication module 435 may establish the requested common communication pathway.

Referring back to FIG. 3, the second communication module 335 may, for example, establish a second secure communication pathway that is linked to (e.g., communicatively coupled with) a first secure communication pathway. In establishing such a communication pathway, the second communication module 335 may, for example, perform various general operations related to establishing a secure communication pathway. Exemplary illustrations of such operations were provided previously with regard to the discussion of steps 130, 150 and 252 of the methods 100, 200 illustrated in FIGS. 1-2.

The second communication module 335 may, for example, link (e.g., communicatively couple) the second secure communication pathway to a first secure communication pathway. The second communication module 335 may, for example, communicatively couple the second secure communication pathway to the first secure communication pathway in any of a variety of ways. For example and without limitation, the second communication module 335 may share encryption key information. For example, in a scenario where the first secure communication pathway utilizes a first encryption key, the first system 360 or the second communication module 335 may communicate information of the first encryption key to the second system 370.

Also for example, the second communication module 335 may utilize the transcription module 345 to transcribe between information encrypted with a first encryption key and information encrypted with a second encryption key. For example, in a scenario where the first secure communication pathway comprises information encrypted with a first encryption key, and the second secure communication pathway comprises information encrypted with a second encryption key, the transcription module 345 may transcribe between information encrypted with the first encryption key and information encrypted with the second key. In such an exemplary scenario, the first and second secure communication pathways may be communicatively coupled while being based on respective and different encryption keys.

Referring to FIG. 4, in an exemplary scenario where the user interface system 410 comprises a video display system 440 having a display device 442, the second communication module 435 may receive a request for a shared secure communication pathway between the second system 470 and the first window 443 of the display device 442, where the shared secure communication pathway is to be communicatively coupled to a pre-existing first secure communication pathway that extends between the first window 443 of the display device 442 and the first system 460. In such an exemplary scenario, the second communication module 435 may respond to such a request by utilizing the secure access module 450 to determine whether the second system 470 is authorized for such a communication pathway. If the second system 470 is authorized for such a communication pathway, then the second communication module 435 may establish a second secure communication pathway between the second system 470 and the first window 443 of the display device 442. Establishing such a second secure communication pathway may, for example, comprise communicatively coupling the second secure communication pathway to the first secure communication pathway.

As mentioned previously, in general, the various modules and components discussed in the previous discussion may, for example be implemented in hardware, software, or a combination thereof. For example and without limitation, the various modules discussed previously may be integrated in a single integrated circuit, or may, for example, be implemented utilizing a processor executing software or firmware instructions. Accordingly, the scope of various aspects of the present invention should by no means be limited by characteristics of particular hardware or software utilizations or implementations of various aspects of the present invention.

In summary, aspects of the present invention provide a system and method for a secure user interface in a shared resource environment. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. In a video display system, in which a first secure communication pathway comprising a first wireless communication link has been established between a first user device and a display of the video display system, a method for providing a second communication pathway, the method comprising:
   establishing a second wireless communication link between the video display system and a second user device;
   receiving, via the second wireless communication link, a request from the second user device for a second communication pathway between the second user device and the display of the video display system;
   determining whether the received request is a request for a second communication pathway linked to the first secure communication pathway;
   if it is determined that the received request is a request for a second communication pathway linked to the first secure communication pathway, then determining whether the second user device is authorized to access information being communicated between the first user device and the display of the video display system via the first secure communication pathway; and
   if it is determined that the second user device is authorized to access information being communicated between the first user device and the display of the video display system via the first secure communication pathway, then establishing the second communication pathway linked to the first secure communication pathway.

2. The method of claim 1, wherein said determining whether the second user device is authorized to access information being communicated between the first user device and the display of the video display system via the first secure communication pathway comprises determining secure communication capability of the second user device.

3. The method of claim 2, wherein said determining whether the second user device is authorized to access information being communicated between the first user device and the display of the video display system via the first secure communication pathway comprises receiving from the first user device an indication of the secure communication capability that another device must have to be allowed to establish a communication pathway that is coupled to the first secure communication pathway.

4. The method of claim 2, wherein said determining whether the second user device is authorized to access information being communicated between the first user device and the display of the video display system via the first secure communication pathway comprises communicating the determined secure communication capability of the second user device to the first user device.

5. The method of claim 1, wherein said determining whether the second user device is authorized to access information being communicated between the first user device and the display of the video display system via the first secure communication pathway comprises determining whether the second user device desires to receive secure information from the first secure communication pathway.

6. The method of claim 1, wherein said determining whether the second user device is authorized to access information being communicated between the first user device and the display of the video display system via the first secure communication pathway comprises communicating with the first user device to determine whether access to the first secure communication pathway by the second user device is authorized.

7. The method of claim 1, wherein said determining whether the second user device is authorized to access information being communicated between the first user device and the display of the video display system via the first secure communication pathway comprises comparing the identity of the second user device to a list of authorized devices.

8. The method of claim 7, wherein said determining whether the second user device is authorized to access information being communicated between the first user device and the display of the video display system via the first secure communication pathway comprises receiving the list of authorized devices from the first user device.

9. The method of claim 1, wherein:
   the first secure communication pathway extends from the first user device to a window of the display of the video display system; and
   said establishing the second communication pathway linked to the first secure communication pathway comprises providing the second user device secure access to the window.

10. The method of claim 1, wherein said establishing the second communication pathway linked to the first secure communication pathway comprises communicating an encryption key associated with the first secure communication pathway to the second user device.

11. The method of claim 1, wherein said establishing the second communication pathway linked to the first secure communication pathway comprises transcribing between information encrypted with a first encryption key and information encrypted with a second encryption key.

12. The method of claim 1, wherein said second user device is a personal computing device.

13. In a video display system, in which a first secure communication pathway comprising a first wireless communication link has been established between a first user device and a display of the video display system, a sub-system operable to provide a second communication pathway, the sub-system comprising:

at least one module operable to, at least:
- establish a second wireless communication link between the video display system and a second user device;
- receive, via the second wireless communication link, a request from the second user device for a second communication pathway between the second user device and the display of the video display system;
- determine whether the received request is a request for a second communication pathway linked to the first secure communication pathway;
- if it is determined that the received request is a request for a second communication pathway linked to the first secure communication pathway, then determine whether the second user device is authorized to access information being communicated between the first user device and the display of the video display system via the first secure communication pathway; and
- if it is determined that the second user device is authorized to access information being communicated between the first user device and the display of the video display system via the first secure communication pathway, then establish the second communication pathway linked to the first secure communication pathway.

14. The sub-system of claim 13, wherein said at least one module is operable to determine whether the second user device is authorized to access information being communicated between the first user device and the display of the video display system via the first secure communication pathway by, at least in part, operating to determine secure communication capability of the second user device.

15. The sub-system of claim 14, wherein said at least one module is operable to determine whether the second user device is authorized to access information being communicated between the first user device and the display of the video display system via the first secure communication pathway by, at least in part, operating to receive from the first user device an indication of the secure communication capability that another device must have to be allowed to establish a communication pathway that is coupled to the first secure communication pathway.

16. The sub-system of claim 14, wherein said at least one module is operable to determine whether the second user device is authorized to access information being communicated between the first user device and the display of the video display system via the first secure communication pathway by, at least in part, operating to communicate the determined secure communication capability of the second user device to the first user device.

17. The sub-system of claim 13, wherein said at least one module is operable to determine whether the second user device is authorized to access information being communicated between the first user device and the display of the video display system via the first secure communication pathway by, at least in part, operating to determine whether the second user device desires to receive secure information from the first secure communication pathway.

18. The sub-system of claim 13, wherein said at least one module is operable to determine whether the second user device is authorized to access information being communicated between the first user device and the display of the video display system via the first secure communication pathway by, at least in part, operating to communicate with the first user device to determine whether access to the first secure communication pathway by the second user device is authorized.

19. The sub-system of claim 13, wherein said at least one module is operable to determine whether the second user device is authorized to access information being communicated between the first user device and the display of the video display system via the first secure communication pathway by, at least in part, operating to compare the identity of the second user device to a list of authorized devices.

20. The sub-system of claim 19, wherein said at least one module is operable to determine whether the second user device is authorized to access information being communicated between the first user device and the display of the video display system via the first secure communication pathway by, at least in part, operating to receive the list of authorized devices from the first user device.

21. The sub-system of claim 13, wherein:
- the first secure communication pathway extends from the first user device to a window of the display of the video display system; and
- said at least one module is operable to establish the second communication pathway linked to the first secure communication pathway by, at least in part, operating to provide the second user device secure access to the window.

22. The sub-system of claim 13, wherein said at least one module is operable to establish the second communication pathway linked to the first secure communication pathway by, at least in part, operating to communicate an encryption key associated with the first secure communication pathway to the second user device.

23. The sub-system of claim 13, wherein said at least one module is operable to establish the second communication pathway linked to the first secure communication pathway by, at least in part, operating to transcribe between information encrypted with a first encryption key and information encrypted with a second encryption key.

24. The sub-system of claim 13, where said second user device is a personal computing device.

* * * * *